United States Patent
Hester et al.

(10) Patent No.: US 7,274,323 B2
(45) Date of Patent: Sep. 25, 2007

(54) REMOTE PHASE SYNCHRONIZATION USING A LOW-BANDWIDTH TIMING REFERENCER

(75) Inventors: Jeffrey A. Hester, Issaquah, WA (US); William C. Weist, Boca Raton, FL (US)

(73) Assignee: Honeywell International Inc., Morristown, NJ (US)

( * ) Notice: Subject to any disclaimer, the term of this patent is extended or adjusted under 35 U.S.C. 154(b) by 444 days.

(21) Appl. No.: 10/910,937

(22) Filed: Aug. 3, 2004

(65) Prior Publication Data

US 2005/0128135 A1    Jun. 16, 2005

Related U.S. Application Data

(60) Provisional application No. 60/528,418, filed on Dec. 10, 2003.

(51) Int. Cl.
G01S 7/28    (2006.01)

(52) U.S. Cl. ........................ 342/103; 342/28; 342/114

(58) Field of Classification Search ................ 342/61, 342/82, 89–103, 135, 136; 356/4.01, 5.01; 375/327, 376
See application file for complete search history.

(56) References Cited

U.S. PATENT DOCUMENTS

| | | | | |
|---|---|---|---|---|
| 3,689,156 A | * | 9/1972 | Kerpchar | 356/5.04 |
| 4,001,823 A | * | 1/1977 | Matsui et al. | 342/90 |
| 5,148,175 A | * | 9/1992 | Woolfolk | 342/95 |
| 5,805,110 A | * | 9/1998 | McEwan | 342/387 |
| 6,731,234 B1 | * | 5/2004 | Hager et al. | 342/94 |
| 2004/0178947 A1 | * | 9/2004 | Richley et al. | 342/118 |

* cited by examiner

*Primary Examiner*—Isam Alsomiri
(74) *Attorney, Agent, or Firm*—Black Lowe & Graham PLLC

(57) ABSTRACT

A method and apparatus for synchronized clocking between a radar receiver and a radar transmitter includes sharing a reference signal between the transmitter and receiver, dividing the common reference into a transmit clock signal in the transmitter and a receive clock signal in the receiver. The receive clock signal and the transmit clock signal are synchronized using a trigger pulse. The synchronization is performed to achieve a 180 degree phase shift between the transmit and receive clocks. Radar pulse transmissions occur on an edge of the transmit clock coinciding with the trigger pulse. A signal recorder is activated on the edge of the receive clock each time the trigger pulse is received. The signal recorder is deactivated after a fixed interval based upon the receiver clock signal.

5 Claims, 4 Drawing Sheets

REMOTE PHASE SYNCHRONIZATION USING A LOW-BANDWIDTH TIMING REFERENCER

PRIORITY CLAIM

This application claims priority from U.S. Provisional Application Ser. No. 60/528,418 filed on Dec. 10, 2003 and incorporated by this reference.

FIELD OF THE INVENTION

This invention relates generally to radar and, more specifically, to radar timing synchronization between receiver and transmitter.

BACKGROUND OF THE INVENTION

The ability to detect the "shift in the phase" of consecutive pulses of electromagnetic energy allows a Doppler radar to detect motion. The phase of the returning signal changes based upon the motion of targets with respect to the radar. A radar processor measures the phase change of the reflected pulses of energy and then converts that change to a velocity of the object, either toward or from the radar. Doppler processing requires pulse-to-pulse phase coherency over a series of many pulses to make this measurement.

Most radar designs co-locate the transmit and receive functions so they can share a timing reference to maintain coherency. In some radars, the transmit and receive functions are distributed functions. Successful radar ranging and motion detection typically requires the sharing of high bandwidth timing signals using coaxial cables which can be very sensitive to small variations and difficult to maintain.

Doppler radar generally has employed shared clocks in a transmitter and receiver in addition to a timing pulse, generally denoted as $T_0$, which simultaneously triggers the transmission of a pulse and the start of radar echo signal collection. All pulse radars require precise knowledge of the transmit time, $T_0$, and the target echo receive time to determine the target range. This requires that the $T_0$ signal itself and the transmit and receive processes that follow must be accurate and repeatable to within 1 cycle of the shared reference clock. Any deviation from an identical interval degrades the ability to detect small phase shifts in the received echoes from pulse to pulse. For example, a 64 MHz shared clock this means a precision of better than 15.625 nanoseconds.

Clock jitter, i.e. timing variations caused by phase noise, on an analog-to-digital, or A/D, clock signal in a Doppler radar has a direct effect on the performance of the Doppler radar due to phase errors in the received signal. For example, a sampled 48 MHz intermediate frequency signal will have phase errors of 1 degree if the A/D sample jitter is as small as a variation of 58 picoseconds. The effect of clock jitter on a sample is to degrade the signal-to-noise ratio commonly denoted as SNR of the A/D converter. For many systems, clock jitter is the largest portion of the A/D SNR budget and if controlled, has a great influence on performance of a Doppler radar.

There is a need for removing clock jitter in synchronizing a receiver and transmitter for a radar installation. Traditionally, a timing signal of sufficient resolution must include a very steep onset of the timing pulse to render a very precise timing. Including many of the high harmonics is necessary to lend precision to the signal and therefore high bandwidth is necessary to convey a suitable timing signal. The high bandwidth requires either that the design of the radar collocates the transmit and receive functions or increases the system cost with a high bandwidth communication link between the transmitter and receiver functions.

Thus, there is an unmet need in the art for a synchronization system that removes the need for a timing signal with a very steep onset.

SUMMARY OF THE INVENTION

A method and apparatus for synchronized clocking of a remotely located radar receiver without a high bandwidth timing signal is presented and includes creating a local reference clock in both the transmitter and receiver by dividing a common reference clock signal to a lower frequency. At start up, a low bandwidth timing reference coherent with one of the divided clocks is used to synchronize the other divided clock. All transmission and receive events are then slaved to the transitions of the divided clocks and allows the transmit start time reference to be sent between the transmitter and receiver with a low bandwidth signal. A signal recorder is activated upon receiving a triggering pulse if coherency is present. The signal recorder is deactivated after a fixed interval based upon the receiver clock signal.

The present invention comprises an apparatus and method wherein comparing the receiver clock signal to the transmitter clock signal for coherency includes confirming locking status of a phase-locked loop demodulator on a carrier signal.

In accordance with other aspects of the invention, comparing the receiver clock signal to the transmitter clock signal for coherency includes confirming storage of a pulse header.

In accordance with still further aspects of the invention, comparing the receiver clock signal to the transmitter clock signal for coherency includes confirming pulse header interrupt to a digital signal processor.

In accordance with further aspects of the invention, an apparatus for synchronized clocking signal transmission between a radar transmitter and receiver, the apparatus includes a clocking link for clocking the receiver according to a clocking signal from the transmitter; a data link for receiving a fixed number of zero bits and pulse data from the transmitter; and a signal link for receiving a synchronizing signal to synchronize the receiver to the transmitter. Advantageously, a further aspect of the invention allows a single channel to incorporate all three links in either a guided wave devices (e.g. coax, fiber optic, etc.) or an unguided wave devices, i.e. wireless (e.g. RF or optical channels).

In accordance with still another aspect of the invention, a receiver logic module initiates the temporal protocol according to the synchronizing signal. The temporal protocol includes a receptive interval.

In accordance with yet another aspect of the invention, the temporal protocol includes a pulse data interval.

In accordance with further aspects of the invention, the receiver logic module initiates pulse data header formulation during the pulse data interval. In accordance with still further aspects of the invention, the receiver module initiates storing radar return signals in association with the pulse data header following the pulse data interval.

In accordance with additional aspects of the invention, the receiver logic module initiates sending return data to a digital signal processor during the pulse data interval.

As will be readily appreciated from the foregoing summary, the invention provides a remote phase synchronization using a low-bandwidth timing referencer.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method and apparatus for synchronized clocking of a radar receiver and transmitter without a high bandwidth link is presented and includes dividing a reference clock signal in the transmitter into a transmit clock and dividing the same reference clock signal sent from the transmitter to the receiver into a receive clock signal. All pulse transmissions are triggered by a leading edge of the transmit clock and all receiver start times are triggered by a leading edge of the receive clock. A triggering pulse is sent from the radar transmitter at start-up to synchronize the receiver clock. Subsequent trigger pulses, $T_0$, sent from the transmitter to the receiver tell the receiver to activate a signal recorder at the next leading edge of a receive clock signal. Those skilled in the art will readily appreciate that timing of the receive clock may be either with reference to the leading or trailing edge of the clock signal. The signal recorder is deactivated after a fixed interval based upon the receive clock signal.

The present invention relates to timing radar technology. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

The inventive Doppler radar receiver receives a precise clocking signal of a known frequency from the radar transmitter. It will readily be appreciated by those skilled in the art that either the transmitter or the receiver may be the source of the precise clocking signal and that the process described will suitably synchronize the two functions of the radar. In the context of a radar, accuracy is a measure of how close the result of the experiment is to the true value. Therefore, it is a measure of the correctness of the result. Precision is a measure of how well a result has been determined, without reference to its agreement with the true value. It is a measure of the reproducibility of the result. The clocking signal will be the reference for system accuracy and need only be regular and precise.

The clocking signal from the transmitter will have a known frequency. For radar transmitters, clocking signals of 336 MHz is used in at least one preferred embodiment. A receiver may advantageously use a clocking signal of 64 MHz. These frequencies are arbitrary and selected for optimal operation of the receiver and transmitter functions. It is important for the purposes of effecting synchronization, that the transmitter clock and receiver clock are slaved to the same frequency reference.

Figure 1:
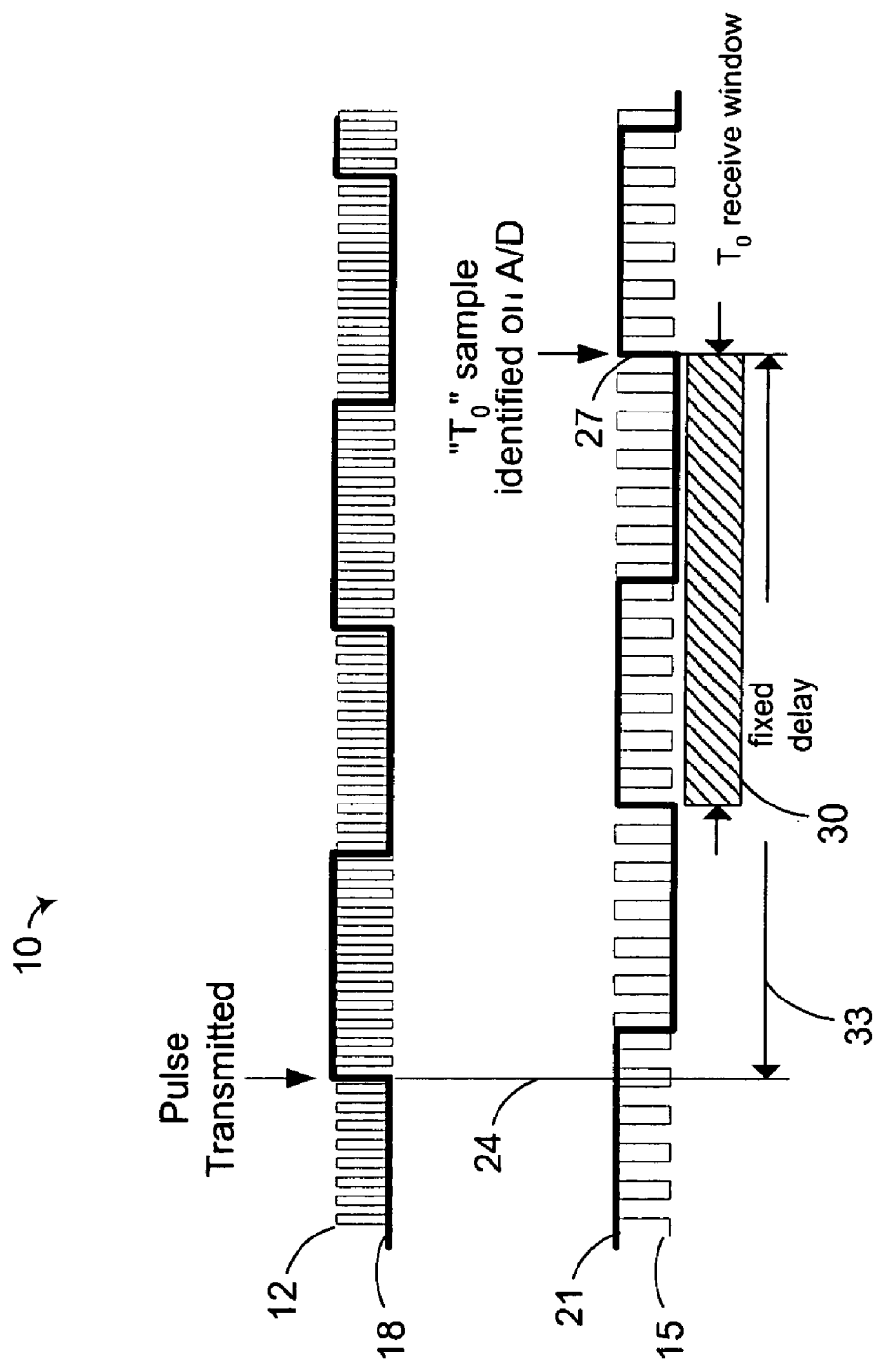
FIG. 1 is a time scale diagram of a timing scheme for a low-bandwidth timing referencer.

Referring to FIG. 1, a timing scheme 10 relates a transmitter clock signal 12 to a receiver clock signal 15. Because the timing requirements for the transmitter clock signal 12 and the receiver clock signal 15 are distinct and each are driven by several different performance requirements, they need only be coherent and not congruent. By coherent in this context, two signals are to be related as either a fundamental signal and a harmonic or two harmonics of a fundamental; some edges of the two signals coinciding regularly and precisely. The preferred method for assuring the coincidence of the signal edges is to generate the signals from a common source, generally a reference crystal oscillator associated with the transmitter circuitry.

Once a common clocking reference generates the transmitter clock signal 12 coherent with the receiver clock signal 15, a transmitter logic signal 18 is generated as a sort of common denominator between the signals. By dividing either the reference signal or the transmitter clock signal 12 down to generate the coherent transmitter logic signal with a longer period, to facilitate communication between the transmitter and receiver. A synchronizing $T_0$ signal over a communication link between the transmitter and receiver needs only enough bandwidth to resolve a much longer clock cycle of the transmitter logic signal 18 while still maintaining the stability of the reference signal. In the presently preferred embodiment, the transmitter clock signal 12 has a frequency suitably selected to be 336 MHz, the receiver clock signal frequency is suitably selected at 64 MHz, and the transmitter logic signal 18 is suitably selected at 1 MHz such that each cycle of the transmitter logic signal 18 is 1 μs in duration.

Clocking communications across between the transmitter and the receiver presents some issues dues to propagation delays. The purpose of the transmitter logic signal 18 is to frame communication between the transmitter and receiver by means of a communications link. As shown in the timing scheme 10, a fixed propagation delay as the transmitter logic signal 18 propagates along the communication link. Thus if a pulse is transmitted from the transmitter at a transmission moment 24, the pulse is not received at the receiver until a reception moment 27 after a propagation delay 30. A receiver logic signal 21 is therefore out of synchronization with the transmitter logic signal. Once a duration of the fixed delay is known, a period of reception sensitivity or a $T_0$ reception window can advantageously be defined so long as pulses are sent at defined times according to the transmitter logic signal 18. By defining signals a temporal relationship between moments appropriate for transmitted signals and moment for received signals according to the transmitter logic signal and the receiver logic signal, the communication link can be compensated for the fixed propagation delay 30.

Figure 2:
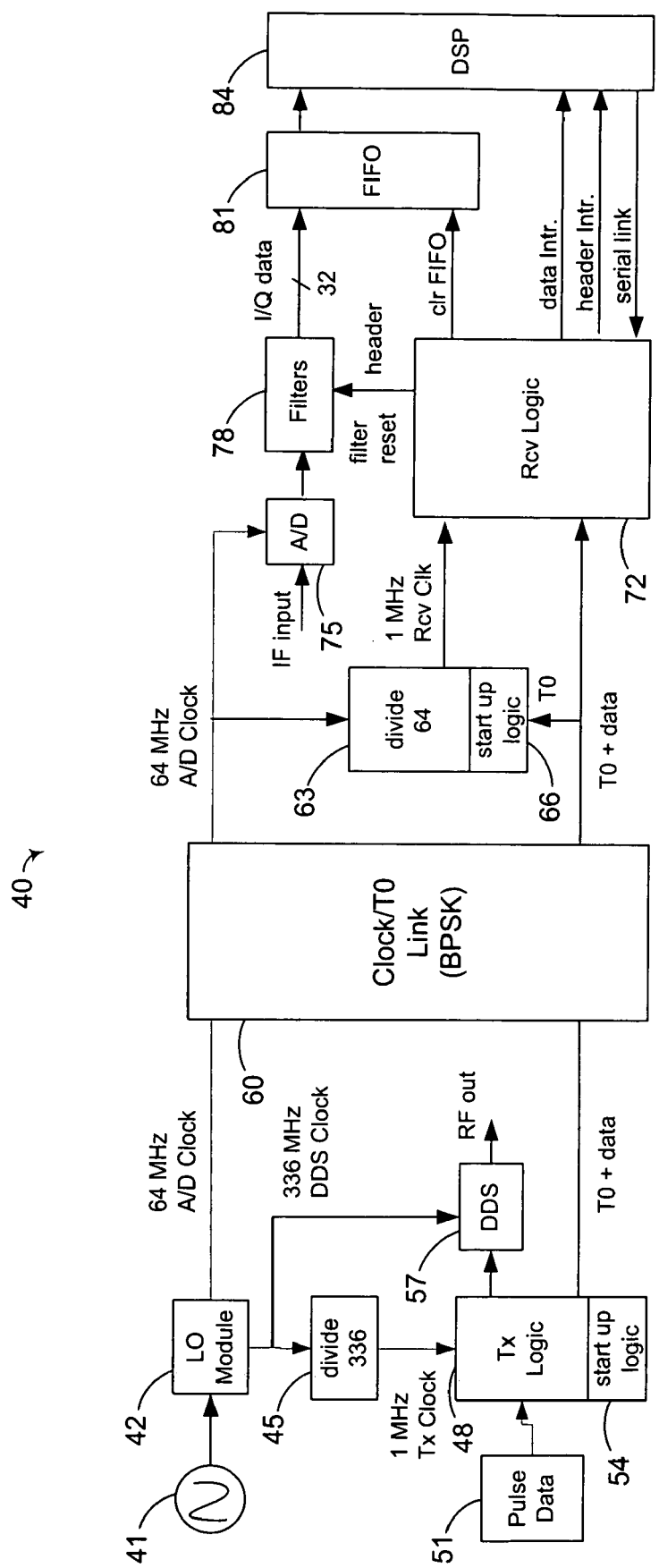
FIG. 2 is a block diagram of a low-bandwidth timing referencer.

Referring to FIG. 2, a preferred embodiment of a clocking interface between an transmitter and a receiver includes a reference quartz oscillator 41. The reference quartz oscillator 41 is suitably stable yielding a predictable regular output signal wave. A local oscillator module 42 takes the output signal from the reference quartz oscillator 41 to generate a stable clocking signal at a fixed and suitable frequency. The local oscillator module 42 derives all frequency sources for the transmit and receive functions.

Digital frequency dividers within the local oscillator module 42 allow the local oscillator module 42 to output coherent clocking signals at frequencies that are related as harmonics of a single frequency. In the presently preferred embodiment, The local oscillator module 42 generates coherent clocking signals at suitably generated frequencies of 336 MHz and 64 MHz. These derived frequencies are products of the 128 MHz reference crystal oscillator and are therefore coherent. The 336 MHz output is further divided down in a 336 divider 45 to produce the 1 MHz transmitter logic signal 18 (FIG. 1).

In the presently preferred embodiment, the 336 MHz output also feeds the Direct-Digital Synthesis or DDS module 57. The DDS module 57 is a circuit that can create a sine-wave signal from a reference crystal and a programmable frequency-register. The DDS module 57 the 336 MHz output from the local oscillator module 42 to produces a smooth RF signal pulse for transmission downrange at a target.

A transmitter logic module 48 receives and uses the 1 MHz transmitter logic signal 18 to trigger DDS transmissions from the DDS module 57 on a fixed 1 µs boundary. Additionally in the presently preferred embodiment, the transmitter logic module 48 shall format a pulse data message and send it to a clock communications link 60 for transmission to the receiver. The transmitter sends the timing pulse, $T_0$, 10 µs prior to the transmission of the smooth RF signal pulse by the DDS module 57.

The transmitter logic module 48 completes the transmission of the synchronizing $T_0$ signal and the pulse data to the clock communications link 60 a suitable time before the start of transmission of the smooth RF signal pulse by the DDS module 57, in the case of the presently preferred embodiment, 2 µs prior to the pulse.

The clock communications link 60 in the presently preferred embodiment includes a wave-guide, generally a coaxial cable. At a receiver side there is a demodulator and at the transmitter side, a modulator for enabling transmission of clock and other signals over the coaxial cable. In the presently preferred embodiment, the signals are transmitted by means of binary phase-shift keying or BPSK.

BPSK is a digital frequency modulation technique used for sending data over a coaxial cable network. Binary phase-shift keying (binary PSK, or BPSK) is phase-shift keying (PSK) between two phase-states, normally 180 degrees apart. This type of modulation is less efficient—but also less susceptible to noise—than similar modulation techniques, such as QPSK and 64QAM.

Because a BPSK-modulated signal contains both a carrier and an inverse carrier, its demodulator must use a Phase-Locked Loop (PLL) to regenerate the carrier signal. There is no way for the demodulator's PLL to tell whether it has locked on to the mark (1) carrier or the space (0) carrier. In commercial systems using variants of BPSK, such as IEEE 802.3 (Ethernet), data is sent in chunks, each of which contains a header known to the receiver. The receiver can then determine whether it has locked to the mark or the space signal. If the PLL is locked to the space, each demodulated bit will be inverted compared with the original message signal.

Excess noise causes the PLL to lose its lock on the carrier. When the PLL re-locks, it may lock onto the opposite polarity carrier. In this case, all bits subsequently transmitted (up until the next known header sequence) will generate errors. In the start-up logic set forth below, checking the lock of the PLL is advantageous in assuring a synchronized communications link.

The 64 MHz signal generated at the local oscillator module 42 is passed through the clock communications link 60 and divided by 64 in a 64 divider 63 to generate the receiver logic signal 21 (FIG. 1). The 64 divider 63 facilitates synchronizing the 1 MHz receiver logic signal 21 (FIG. 1) to the 1 MHz transmitter logic signal 18 (FIG. 1).

A receiver start-up logic module 66 uses the receiver logic signal 21 and the synchronizing $T_0$ signal (FIG. 1) to synchronize the 1 MHz receiver logic signal 21 (FIG. 1) to the 1 MHz transmitter logic signal 18 (FIG. 1). Additionally, the receiver start-up logic module 66 automatically resynchronizes on the next $T_0$ timing signal anytime the receiver start-up logic module 66 determines that it has lost synchronization.

The receiver start-up logic module 66 employs a $T_0$ Startup Logic by using steps to test and achieve synchronization:

1) At a power up, or whenever the synchronizing $T_0$ signal is received, or whenever the receiver start-up logic module 66 determines synchronization is lost; the receiver start-up logic module 66 shall activate the synchronization process.

2) The receiver start-up logic module 66 uses the synchronizing $T_0$ signal to start the 1 MHz receiver logic signal 21 (FIG. 1) derived from the 64 MHz signal generated at the local oscillator module 42; and 3) In the present preferred embodiment, a 1 MHz receiver logic signal 21 (FIG. 1) derived from the 64 MHz signal is inverted with respect to the 1 MHz transmitter logic signal 18 (FIG. 1). This is a suitable precaution in the design to ensure that the following $T_0$ signals do not produce a race condition by being too close to a transition in the receiver 1 MHz clock 21. Since the $T_0$ signals on the transmitter side of the clock communications link 60 are always generated on the same 1 µs boundary 24, the $T_0$ signals on the receiver side or the clock communications link 60 will arrive approximately at the midpoint of the 1 MHz receiver logic signal 21 (FIG. 1) cycle. This minimizes sensitivity to noise, timing jitter, and signal bandwidth 30 while still maintaining a precise fixed delay between the Pulse Transmit time and the start of the receive window 33. Furthermore, since both the 1 MHz transmit and receive clocks originate from the same common reference, this precise fixed delay is repeatable to within the jitter of the common reference which is one the order of several pico seconds ($10^{-12}$) while the $T_0$ signal may be varying by 5 orders of magnitude higher ($10^{-7}$).

The receive logic module 72 latches all subsequent $T_0$ signals sent to indicate a transmitted pulse using the edge of the 1 MHz receiver logic signal 21 (FIG. 1). Since all $T_0$ signals are generated from the 1 MHz transmit clock which is 180 degrees out of phase from the 1 MHz receive clock, they will arrive in the middle of a 1 MHz receive clock cycle and get latched at the start of the next cycle.

After accounting for the half-cycle delay in the 1 MHz receiver logic signal 21 (FIG. 1) and the fixed delays attributable to propagation of the synchronizing $T_0$ signal through the clock communications link 60, the only remaining fixed delay occurs in the propagation of the radar echo signal through the front end analog filters (not shown). The delay uncertainty is reduced to less than 100 ns.

As indicated above, the transmitter logic module 48 completes the transmission of the synchronizing $T_0$ signal and the pulse data to the clock communications link 60 a suitable time before the start of transmission of the smooth RF signal pulse by the DDS module 57. The transmission of the smooth RF signal pulse directed at a downrange target results in a echo signal returning to the receiver at an antenna (not pictured). The echo signal is beat against the output of the DDS module 57 to produce an intermediate frequency signal received at an analog-to-digital processor 75.

The analog-to-digital processor 75 feeds a digital signal to the front-end filters 78 to produce in-phase/quatrature data or I/Q data indicative of phase and magnitude in the return signal. Generally, I/Q data refers to data having both magnitude and phase, and it typically refers to data collected as soon as analog data is converted to digital data. The I/Q data is stored over a determined number of cycles, over an interval to determine the Doppler shift (the interval is called a Coherent Processing Interval—CPI). As a group, all of the I/Q data collected over the CPI is stored in digital buffers (not shown) accessible by a digital signal processor 84. A FIFO buffer 81 is used in the presently preferred embodiment to compute a pulse to pulse frequency shift, thereby allowing a target velocity to be calculated by a digital signal processor 84.

In the presently preferred embodiment, I/Q data is exchanged with the FIFO buffer 81 for storing in association with the pulse reception. The pulse data message defines all the parameters of the I/Q data relating to pulses and pulse trains necessary for processing.

The pulse header data helps to sort the pulse returns and at a digital signal processor 84 to discern velocity of a target.

A receiver logic digital signal-processing interface 72 receives the 1 MHz receiver logic signal 21 (FIG. 1) from the receiver start-up logic module 66 as well as the synchronizing $T_0$ signal through the clock communications link 60. The receiver logic digital signal-processing interface 72 governs the actual data collection function. As designed, the transmitter logic module 48 operates autonomously in timing the generation of the synchronizing $T_0$ signal. The receiver logic digital signal-processing interface 72 receives the synchronizing $T_0$ signal and orders the actions of the receiver according to a rigorous schedule of actions and times those actions according to the synchronized receiver logic signal 21 (FIG. 1).

In the presently preferred embodiment, receiver logic digital signal-processing interface 72 sends a data interrupt to the digital signal processor 84 when it receives the synchronizing $T_0$ signal.

The receiver logic digital signal-processing interface 72 stores the pulse data information as a header in the FIFO prior to the sample data. The receiver logic digital signal-processing interface 72 shall begin storing I/Q sample data in the FIFO buffer 81 at a known and repeatable time relative to the synchronizing $T_0$ signal. The receiver logic digital signal-processing interface 72 clears the FIFO buffer 81 no sooner than 8 μs after receiving the synchronizing $T_0$ signal and then continues to store a new pulse header. By this exemplary scheme, the digital signal processor 84 allows 8 μs from the time it receives the last data interrupt to read the contents of the FIFO buffer 81 before it is flushed.

Figure 3:
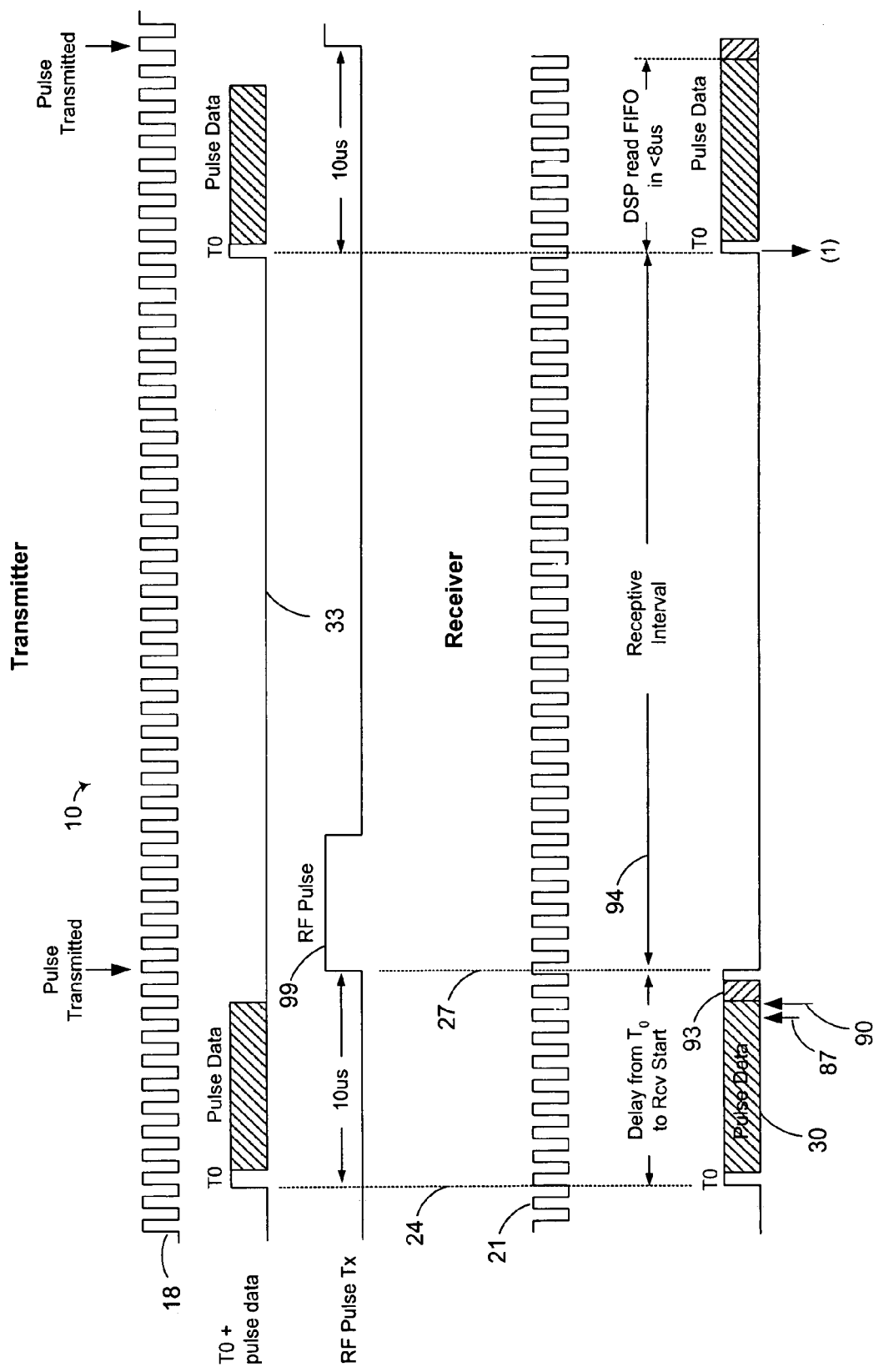
FIG. 3 is a time scale diagram of a timing scheme for a low-bandwidth timing referencer including data movement; and, FIG. 4 is a state diagram of a receiver logic module for a low-bandwidth timing referencer.

Referring to FIG. 3, the timing scheme for the presently preferred embodiment advantageously exploits the timing of the synchronizing $T_0$ signal to appropriately formulate header data for storage in the FIFO buffer 81 (FIG. 2) during periods where the receiver logic digital signal-processing interface 72 places the receiver in a non-receptive state. The transmitter logic signal 18 and the receiver logic signal 21 define durations for events in the timing scheme 10, the events occurring according to dictates of the receiver logic digital signal-processing interface 72.

Accordingly, at the moment of signal transmission on communications link 60, the leading edge of synchronizing $T_0$ signal 24, the receiver logic digital signal-processing interface 72 instructs the FIFO buffer 81 (FIG. 2) to send the data from reflected signals received immediately prior to the receipt of the synchronizing $T_0$ signal to the digital signal processor 84 for processing. While the FIFO buffer 81 (FIG. 2) is sending the data, the receiver logic digital signal-processing interface 72 commands the resetting of the pipeline and of the decimation counters at a moment 87. At a moment 90, the receiver logic digital signal-processing interface 72 commands the FIFO buffer 81 (FIG. 2) to clear to accommodate storing the next pulse header data.

A FIFO pulse header storage interval 93 is designated for the formulation of the pulse header data and storage in the FIFO buffer 81. At the falling edge of the synchronizing $T_0$ signal, simultaneous with the reception of the synchronizing $T_0$ signal at the receiver, the transmitter transmits the smooth RF Pulse 99.

Figure 4:
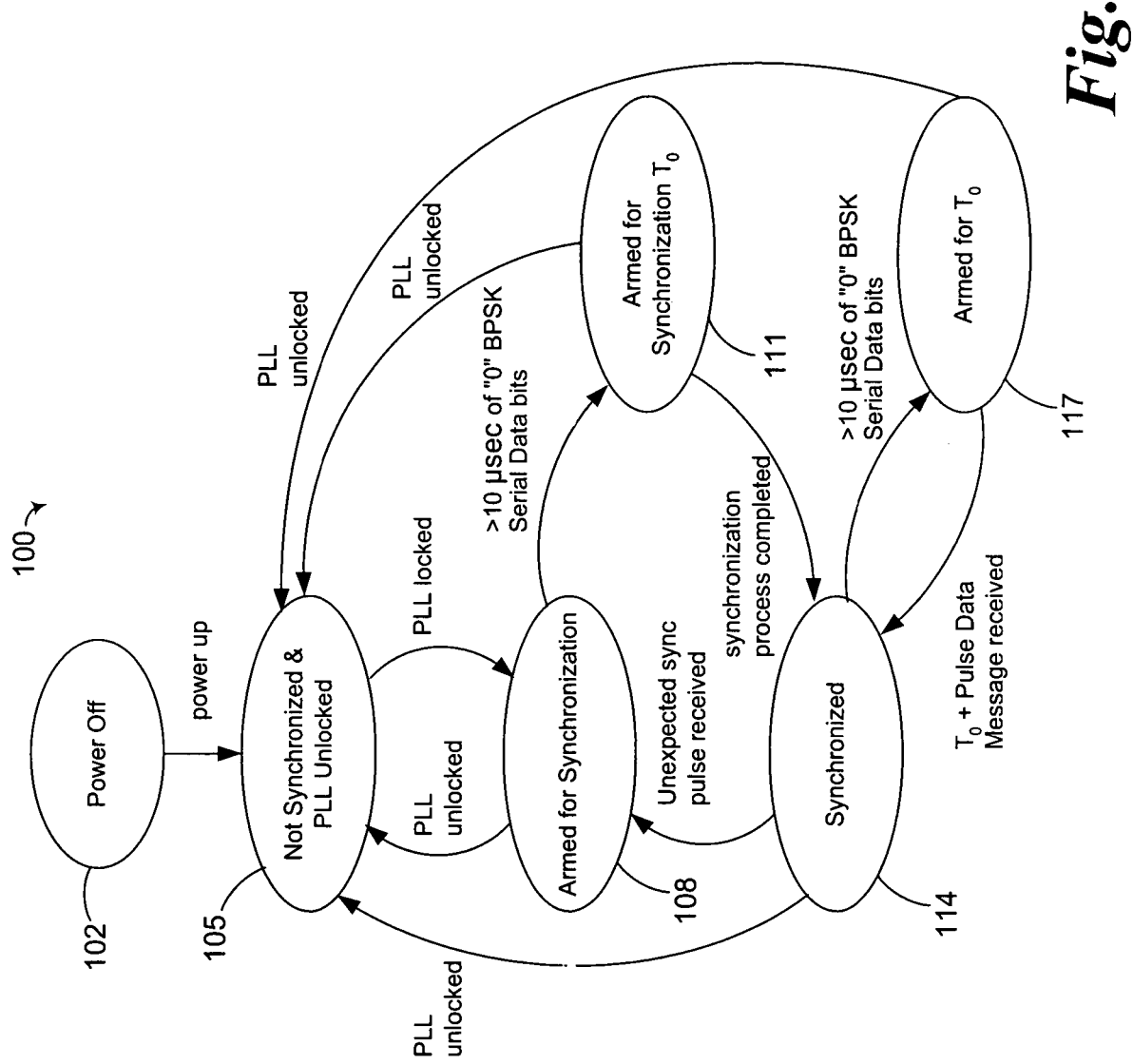

Referring to FIG. 4, as indicated above, in the presently preferred embodiment, the receiver logic digital signal-processing interface 72 has three tasks to perform to synchronize with the relatively autonomous transmitter. The tasks are defined:

1) At a power up, or whenever a the synchronizing $T_0$ signal is received the receiver start-up logic module 66 shall activate the synchronization process, or whenever receiver start-up logic module 66 determines synchronization is lost;
2) The receiver start-up logic module 66 uses the synchronizing $T_0$ signal to start the 1 MHz receiver logic signal 21 (FIG. 1) derived from the 64 MHz signal generated at the local oscillator module 42; and
3) The receiver start-up logic module 66 shall latch all subsequent synchronizing $T_0$ signals using the 1 MHz receiver logic signal 21 (FIG. 1).

A logical state diagram 100, illustrates the synchronizing based upon the synchronizing $T_0$ signal. The process begins at a first state 102, the power off state. As the receiver boots-up to an unsynchronized state 105. This unsynchronized state 105 is the presumptive returning point when any indications of synchronicity are lost.

As indicated above, the clock communications link 60 (FIG. 2) uses BPSK demodulation in the presently preferred embodiment. To demodulate the BPSK signal, the receiver uses a phase-locked loop or PLL demodulator. The demodulator indicates to the receiver start-up logic module 66 by signal communication when a locked state of the PLL exists. Where the PLL is not locked, a first order of business for the receiver start-up logic module 66 is to await a PLL-locked signal to indicate a first level of synchronicity. Upon the receipt of the PLL-locked signal, the receiver start-up logic module 66 shifts to an "armed for synchronization" state 108.

From the "armed for synchronization" state 108, the receiver start-up logic module 66 monitors the clock communications link 60 for an interval of blank data or received zeros indicative a last portion of a data exchange from emanating from the transmitter logic module 48. Awaiting the interval of blank data is an activity that contrasts the inventive method from a handshake method. The receiver start-up logic module 66 sends no "handshake data" to the transmitter logic module 48 but rather relies upon a strict regimen governing communications and enters an "armed for the synchronizing $T_0$ signal synchronization" state 111.

When the receiver start-up logic module 66 is in the "armed for the synchronizing $T_0$ signal synchronization" state 111, the receipt of the synchronizing $T_0$ signal shifts the receiver start-up logic module 66 to the synchronized state 114. Efficient operation of the receiver occurs when the receiver start-up logic module 66 remains in the synchronized state 114 collecting returns from radiated signals from the DSS for the receptive interval 94 (FIG. 3) and then at the end of the receptive interval 94, the receiver start-up logic module 66 awaits the same interval of blank data that allowed movement to the "armed for the synchronizing $T_0$ signal synchronization" state 111, in order to now move into a second "armed for the synchronizing $T_0$ signal synchronization" state 117. This "armed for the synchronizing $T_0$ signal synchronization" state 117 is emblematic, however, of normal efficient operation rather than trying to achieve a synchronized state.

When the synchronizing $T_0$ signal arrives the receiver start-up logic module 66 returns to the synchronized state 114 and stores the pulse header data the transmitter then sends after the arrival of the leading edge of the synchronizing $T_0$ signal. Unless irregular events occur, the efficient operation cycle between states 114 and 117 continues unabated. An irregularity in either the transmitter logic signal 18 or the receiver logic signal 21 might cause the arrival of a synchronizing $T_0$ signal that is not expected. When such an unexpected synchronizing $T_0$ signal arrives, the receiver start-up logic module 66 immediately assumes a loss of synchronicity and returns to the "armed for synchronization" state 108 to begin the process of re-establishing synchronicity.

From every state of the receiver start-up logic module 66, loss of the PLL-lock signal will cause a return to the state 105 from whence the receiver start-up logic module 66 will pass through the above-described states to return to the synchronized state 114.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for synchronized clocking of a radar receiver, the method comprising:

dividing a transmitter reference signal received from a radar transmitter to generate a receiver clock signal;

receiving an edge of a triggering pulse from the radar transmitter;

synchronizing the receiver clock signal to the transmitter clock signal for system coherency;

confirming locking status of a phase-locked loop demodulator on a carrier signal;

activating a signal recorder upon receiving an edge of the triggering pulse;

deactivating the signal recorder after a fixed interval based upon the receiver clock signal.

2. The method of claim 1, wherein synchronizing the transmitter clock signal to the receiver clock signal for coherency includes confirming storage of a pulse header.

3. The method of claim 2, wherein synchronizing the transmitter clock signal to the receiver clock signal for coherency includes confirming pulse header interrupt to a digital signal processor.

4. The method of claim 1, wherein the edge is a leading edge.

5. The method of claim 1, wherein the edge is a trailing edge.

* * * * *